Dec. 29, 1959 A. F. FINO 2,919,047
LIQUID STORAGE FLOATING COVER
Original Filed Nov. 21, 1957 3 Sheets-Sheet 1
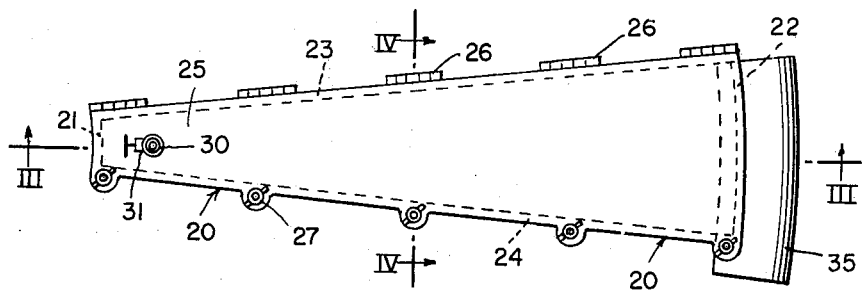
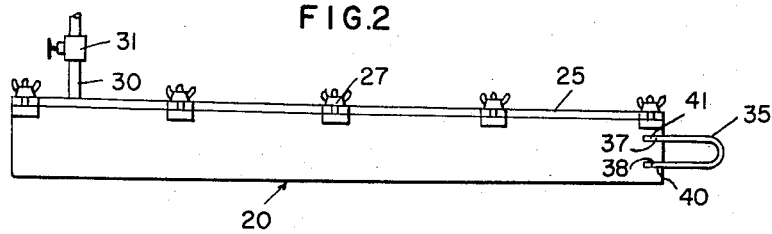
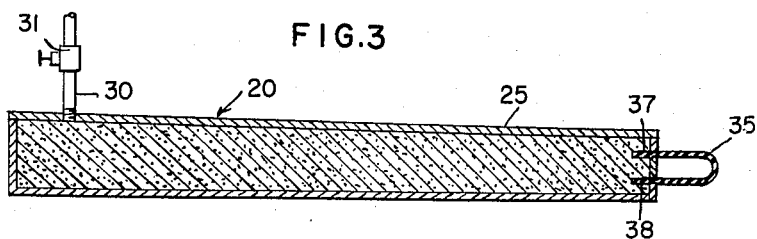
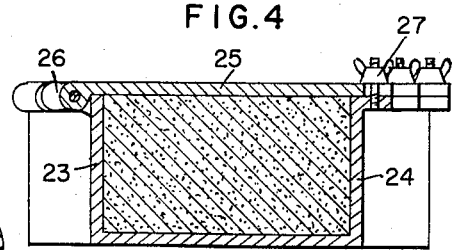
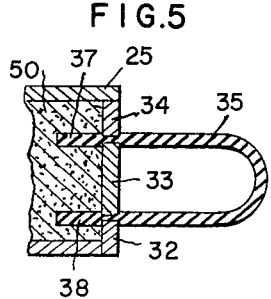
INVENTOR:
Alexander F. Fino
BY
Arthur Middleton
ATTY.

Dec. 29, 1959  A. F. FINO  2,919,047
LIQUID STORAGE FLOATING COVER
Original Filed Nov. 21, 1957  3 Sheets-Sheet 2

INVENTOR:
Alexander F. Fino
BY
ATTY.

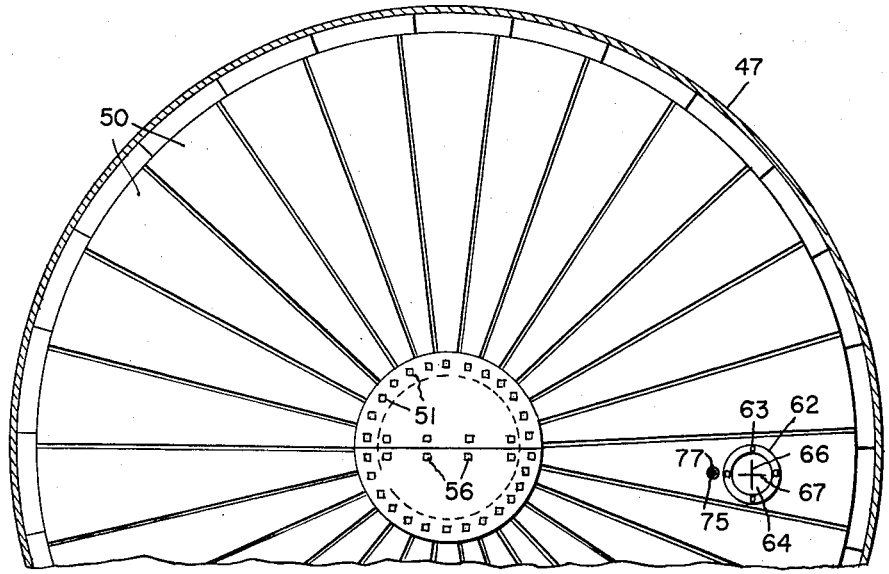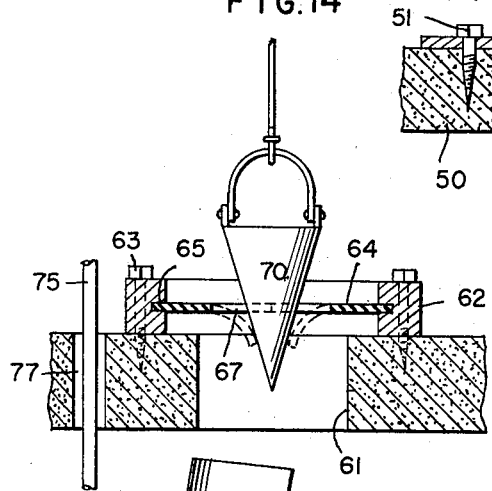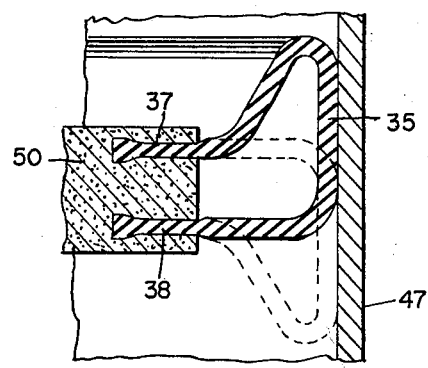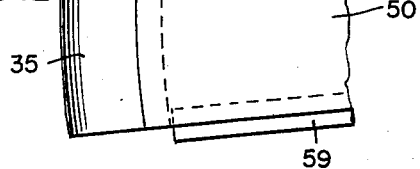

United States Patent Office 2,919,047
Patented Dec. 29, 1959

2,919,047

LIQUID STORAGE FLOATING COVER

Alexander F. Fino, Warren, Pa., assignor to Hammond Iron Works, Warren, Pa., a corporation of Pennsylvania Original application November 21, 1957, Serial No. 697,902. Divided and this application August 19, 1958, Serial No. 755,984

4 Claims. (Cl. 220—26)

The present invention relates to a new and novel liquid storage floating cover and more particularly to a floating cover or roof for oil, chemical, water and other liquid storage tanks wherein the cover or roof floats on the liquid and the periphery of the floating cover carries some kind of a seal for sealing against vapor loss the marginal space between the floating cover and the walls of the tank as the floating cover rises and falls with the rising and falling liquid level of the liquid stored in the tank.

Prior art covers of this type have generally been constructed of metallic materials which are large and bulky in construction, thereby presenting a number of problems when it is desired to utilize such structures with existing tanks. For example, if it is desired to install a known device of this type in an existing tank, it may be extremely difficult to insert the cover within the tank if a permanent roof is installed on the tank since known cover constructions may not be assembled within the tank. Furthermore, the metallic construction produces the danger of sparking when the metallic elements thereof engage the walls of the tank thereby creating a hazard to workmen installing the tank since such sparking may cause an explosion within the tank.

Prior art cover constructions are additionally quite heavy thereby presenting a buoyancy problem since they are intended to float upon the liquid within the tank, and such metallic constructions require machined members, thereby increasing the expense thereof. It is also important for the floating cover to provide good heat insulation for the liquid in the tank, and since metal is a good heat conductor rather than an insulator, known metallic constructions fail to provide adequate heat insulation.

According to the present invention, the new and novel liquid storage floating cover comprises a plurality of relatively stiff sections formed of a suitable plastic foam or like material, such as urethane hereinafter more fully described, which is very light in weight, inert, non-asorbent, non-inflammable, substantially immune to changes in temperature and is also a good heat insulator. The sealing means of the present invention in the form of a looped strip is formed of a material similar to that of the sections. The sealing means is embedded in an associated section when the section is originally manufactured, thereby providing a sturdy, inexpensive construction. The invention arrangement wherein the sealing means is embedded in the associated section rather than being secured thereto by conventional clamping means such as bolts or the like is an important feature since it greatly reduces the weight and cost, yet ensures that no vapor can pass between the sealing means and its associated section.

The various sections are secured to one another by connector members extending between adjacent lateral edges by the sections and a lid closes the center of the cover. The sealing means have overlapping lateral portions, and the entire cover assembly provides an efficient means for preventing loss of vapors due to evaporation. The cover may be assembled within a tank whereby it is capable of utilization with existing tanks, and since the components thereof which are adjacent to the side walls or bottom of the tank during assembly are non-metallic, there is no danger of sparking which might cause an explosion either during installation or maintenance operations. Due to the method of assembly of the present device, no machining of the various components thereof is necessary, thereby reducing the cost of construction to a minimum.

The mixture from which both the relatively stiff or slab-like sections as well as the flexible compressible vapor-sealing strips may be made is a polyester-based polyurethane, a foamable material made by the E. I. du Pont de Nemours & Co., Inc. of Wilmington, Delaware. More particularly, the urethane preferred to herein is made by reacting diisocyanates with a polyester resin, water, and sometimes a catalyst. By varying the molecular weight of the resin, or by using combinations of resins, the properties of the foams can be varied over a wide range from a soft, resilient, flexible and compressible strip material to a relatively hard, stiff, slab-like plank, which incidentally is very easy to cut and shape with tools and yet has the surprising property of resistantly holding screws that are inserted thereinto without first making a starting hole for their entrance. The finished products weigh about two pounds per cubic foot. So when urethane is referred to herein, this type of moldable forming mixture is meant or any equivalent thereof.

An object of the present invention is to provide a new and novel liquid storage floating cover wherein substantially all the components thereof are non-metallic, thereby eliminating the possibility of sparking when the components thereof are in contact with the metallic portions of the tank within which it is utilized.

Another object is the provision of a liquid storage floating cover which can be assembled through a manhole in a tank, whereby the cover can be utilized with existing tanks.

Yet another object is the provision of a liquid storage floating cover which is buoyant and wherein the weight has been reduced to a minimum.

A still further object is the provision of a liquid storage floating cover which is inert, non-absorbent and non-inflammable.

An additional object is the provision of a liquid storage floating cover which serves as a good heat insulator for the liquid stored in the tank.

Another object is to provide a liquid storage floating cover which is substantially immune to changes in temperature.

A further object is the provision of a liquid storage floating cover which is simple and inexpensive in construction yet sturdy and reliable in operation.

Yet another object is to provide a new and novel method for forming a relatively stiff section of a liquid storage floating cover.

Other objects and many of the attendant advantages of the invention will become more apparent when considered in connection with the following specification and accompanying drawings wherein:

Fig. 1 is a top view of a mold utilized in the method for forming one of the relatively stiff sections of the cover;

Fig. 2 is a side view of the device shown in Fig. 1;

Fig. 3 is a sectional view taken along the line III—III of Fig. 1, looking in the direction in the direction of the arrows;

Fig. 4 is a sectional view taken along the line IV—IV of Fig. 1 looking in the direction of the arrows;

Fig. 5 is an enlarged view of a portion of the device shown in Fig. 3;

Fig. 7 is a cross-sectional view of the tank shown in Fig. 6, showing the top of the liquid storage floating cover;

Fig. 8 is an enlarged sectional view of a portion of the apparatus shown in Fig. 6;

Fig. 12 is an enlarged view of the end portion of one of the section members of the apparatus and its associated sealing means;

Fig. 13 is an enlarged view of the outer end of one of the section members illustrating the sealing engagement of the sealing means with the inner wall of the tank; and Fig. 14 is an enlarged sectional view taken along the line XIV—XIV of Fig. 8 showing a sampling bucket adjacent one section of the apparatus.

Figure 6:
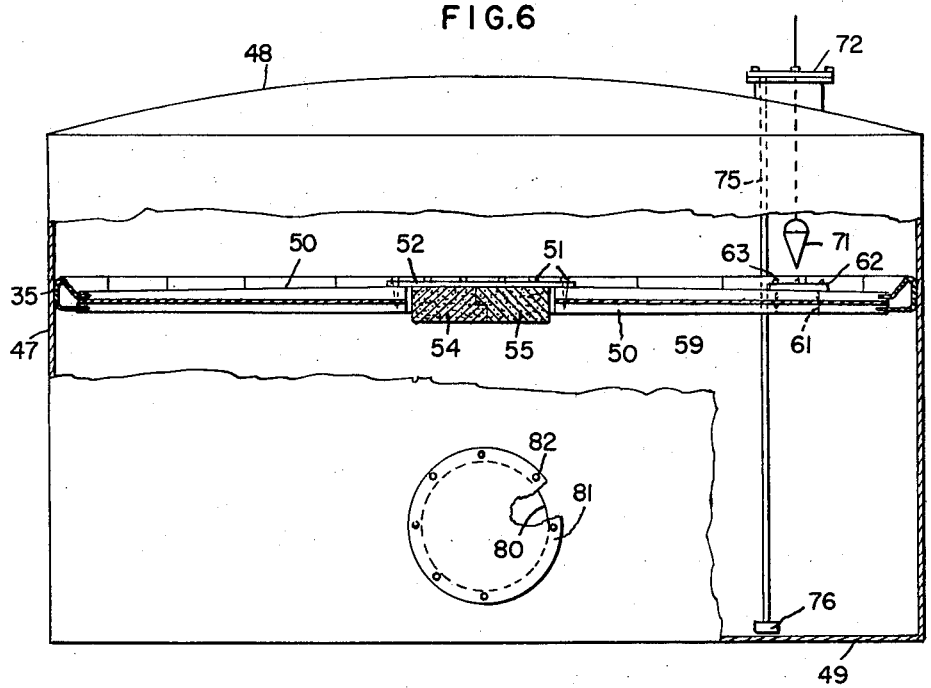
Fig. 6 is a view partly in section of a tank having a liquid storage floating cover according to the present invention installed therein.
Figure 9:
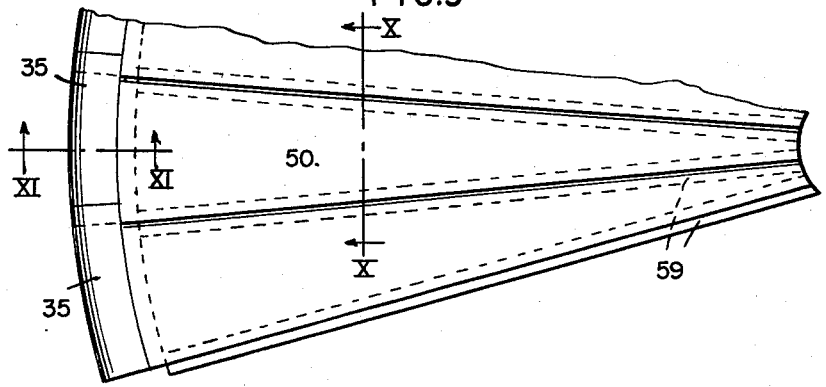
Fig. 9 is an enlarged view of the portion of the apparatus shown in Fig. 7.

Referring now to the drawings wherein like reference characters designate corresponding parts throughout the several views, there is shown in Fig. 1 a substantially sector shaped hollow mold 20, and as seen by the dotted lines of Fig. 1 the opposite end walls 21 and 22 of the mold have a curved configuration while the side walls 23 and 24 which serve to connect the ends of the walls 21 and 22 are substantially linear. The top 25 of the mold is pivoted about a plurality of hinges 26 secured to the outer surface of wall 23 and a plurality of clamps 27 as seen most clearly in Fig. 4 are adapted to maintain the top of the mold in tight engagement with the tops of the side walls 23 and 24. A conduit 30 provided with a control valve 31 extends through the top 25 of the mold and is utilized for introducing a suitable plastic material into the interior of the mold during operation. The tops of side walls 23 and 24 slope slightly in a downward direction from end wall 21 to end wall 22.

As seen most clearly in Figs. 3 and 5, end wall 22 of the mold is composed of a lower fixed portion 32 and two movable portions 33 and 34 which are slidably mounted in suitable vertically extending grooves formed in the inner lateral surfaces of side walls 23 and 24. As seen in each of Figs. 1, 2, 3 and 5, a strip of sealing material 35 is bent into a substantially U-shaped configuration such that the opposite end portions 37 and 38 thereof are disposed within the mold. The sealing member is clamped in the mold as follows:

The sealing strip is initially placed on top of portion 32 of end wall 22 such that the end portion 38 thereof extends within the mold and laterally of the mold through a suitable slot 40 provided through side wall 24 of the mold. Portion 33 of end wall 22 is then inserted within the grooves in side walls 23 and 24 and is moved downwardly into engagement with the sealing strip. The sealing strip is then bent into a looped shape as shown and the opposite end portion 37 of the sealing strip is also inserted within the mold such that it rests on member 33 and extends laterally of the mold through a suitable slot 41 formed through wall 24 in a manner similar to slot 40. Member 34 of end wall 22 is then placed in the grooves of side walls 23 and 24 and is moved downwardly into engagement with the sealing strip.

The top 25 of the mold may then be pivoted about its hinges into closed position and the clamps 27 tightened, thereby urging members 33 and 34 into the position seen most clearly in Fig. 5 wherein the adjacent portions of the sealing strip are compressed as shown.

Figure 11:
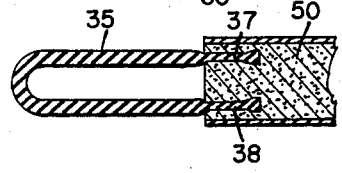
Fig. 11 is a sectional view taken along the line XI—XI of Fig. 9 looking in the direction of the arrows.

A suitable foaming plastic such as urethane or expanded polyethylene and the like is then introduced into the mold through pipe 30 and allowed to set. When the plastic is removed from the mold the section formed by the plastic will be relatively stiff and will possess the characteristics hereinbefore mentioned. The sealing strip will have the opposite ends thereof embedded in the outer end of the section formed thereby, and a portion of the sealing strip within the section will be compressed such that its thickness is less than either the ends thereof or the looped portion extending outwardly from the end of the section as seen in Figs. 11 and 13.

The method of forming the sections may be modified by introducing the foamable plastic material into the mold from the top thereof by means other than through a pipe integral with the top of the mold, and then quickly clamping the top in clamped position as shown before the foaming action of the plastic material reaches too advanced a stage.

Referring now to Figs. 6 and 7, a plurality of sections formed in accordance with the above described method and the associated sealing members are shown in assembled position within a tank having a side wall 47, a top 48 and a bottom 49. The sections 50, formed as previously described, are disposed along side one another and the inner ends thereof are secured by means of lag screws 51 to the outer edge of a disc shaped lid 52 composed of two semi-circular portions. Lid 52 is formed of rigid fiber glass or a resin material such as polyester resin or any other suitable form of rigid plastic. Two substantially semi-circular float members 54 and 55 having interlocking cutout portions formed of a material similar to that of sections 50 are secured to the lower surface of lid 52 by means of lag screws 56. It should be noted that the sloping top surface of the sections 50 will cause any condensate forming on top of the cover to automatically drain off the roof and thence into the tank to thereby conserve the liquid.

Figure 10:
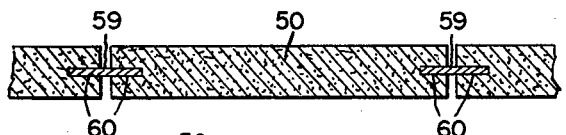
Fig. 10 is a sectional view taken along the line X—X of Fig. 9 looking in the direction of the arrows.

As seen in Fig. 10, each of sections 50 is spaced from the adjacent section and is interconnected with the adjacent section by means of flat elongated connector members 59, formed of a material similar to that of lid 52, disposed within longitudinally extending grooves 60 cut in the lateral surfaces of each of the sections after removing the sections from the mold. In this manner a good vapor seal is maintained between the adjacent sections. The sealing member 35 of each section has a laterally extending portion which overlaps the adjacent lateral portion of the sealing member of an adjacent section and this arrangement is continued circumferentially about the cover thereby providing a continual overlapping engagement of the sealing members insuring a good vapor seal therebetween. The resilient characteristic of sealing strips 35 will also produce an inward centering force keeping the cover substantially equidistant throughout its circumference from the side wall of the tank.

Referring to Fig. 13 the manner of engagement of the looped portion of the sealing members with the side wall of the tank is illustrated. It is apparent that a large area of contact exists between the sealing member and the side wall and that the natural resiliency of the sealing member maintains a good sealing engagement therebetween. The full line as shown in this figure represents the position of the sealing member when the cover is moving downwardly relative to the side wall of the tank. The dotted lines illustrate the position of the sealing member relative to the outer end of the associated section when the cover moves upwardly relative to the side wall of the tank.

When urethane is employed as the material of the sections and associated sealing members a maximum number of closed cells is produced to reduce the absorbency and permeability to a minimum. This is generally sufficient for all practical purposes, but in order to insure that the cover is substantially impervious and will prevent the leakage of all gases therefrom, the upper and lower surfaces of the sections may be covered with neoprene, Buna N or a suitable plastic, as shown only in Fig. 11.

It is often desirable to obtain a sample of the liquid within the tank to determine various characteristics thereof. For this purpose an opening 61 is provided through one of the sections 50 and an annular rim 62 surrounds the upper end of the opening and is secured to the upper surface of the section by means of screws 63. A circular closure member 64 formed of a suitable plastic such as neoprene foam or urethane is mounted in an annular groove 65 formed in the inner surface of rim 62. Two perpendicular slots 66, 67 are cut through the center portion of closure member 64 and bisect one another, thereby forming flexing tongues between the slits past which a sample cup 70 can be raised or lowered. As seen in Fig. 14, the tongues are depressed downwardly as cup 70 is lowered through opening 61. These tongues will automatically close upon removal of the cup from contact therewith due to the natural resilience of the closure means thereby providing an efficient vapor seal. These slits may be accurately cut in the closure member by dropping a plumb bob 71 as seen in Fig. 6 through a manhole 72 in the roof 48 of the tank. The point where the bottom of the plumb bob strikes the closure member is the point of intersection of the two slits therethrough.

In order to additionally maintain the cover means in proper centered position within the tank and to prevent rotation thereof within the tank, a guide means is provided in the form of a wire or cable 75 extending from a point adjacent manhole 72 to the bottom of the tank and either fixed to the bottom or maintained in position by means of a weight 76. Guide wire 75 passes through a suitable opening 77 formed through one of the sections 50 adjacent the opening 61 therein.

An opening 80 is shown in Fig. 6 formed through the side wall 47 of the tank, and a hatch cover 81 is secured thereover by means of suitable bolts 82. Each of the various components of the invention floating cover can pass through opening 80, whereby it is apparent that the cover apparatus can be assembled within the tank.

It is apparent from the foregoing that there is provided a new and novel liquid storage floating cover wherein substantially all the components thereof are non-metallic, thereby eliminating the possibility of sparking when the components thereof are in contact with the metallic portions of the tank within which it is utilized.

The apparatus can be assembled within a tank and the assembled apparatus is buoyant and serves as a good heat insulator for the liquid stored in the tank. The floating cover according to the present invention is inert, non-absorbent, non-inflammable and is substantially immune to changes in temperature. The apparatus is simple and inexpensive in construction yet sturdy and reliable in operation and a new and novel method is disclosed for forming a relatively stiff section of the cover.

As this invention may be embodied in several forms without departing from the spirit or essential characteristics thereof, the present embodiment is therefore illustrative and not restrictive, since the scope of the invention is defined by the appended claims and all changes that fall within the metes and bounds of the claims or that form their functional as well as conjointly cooperative equivalents, are therefore intended to be embraced by those claims.

I claim:

1. A liquid storage floating cover for a tank having a bottom and a side wall which comprises a plurality of relatively stiff slab-like sections disposed alongside one another and connected to each other, and resilient compressible sealing means having the opposite end portions therein embedded in one end of each of said sections and the looped intermediate portion of each of the sealing means extending outwardly from said end portions for sealing the space between the ends of the sections and the side wall of a tank, each of said sealing means being of substantially uniform thickness and including a compressed portion in that portion of each end portion which is embedded within the associated section, said compressed portions being of less thickness than either the adjacent innermost ends of the section or the outwardly extending looped intermediate portion of the sealing means.

2. Apparatus as defined in claim 1 wherein the lateral end portions of said sealing means of adjacent sections overlap one another.

3. Apparatus as defined in claim 1, wherein said relatively stiff sections are molded of a foamable urethane mixture.

4. Apparatus as defined in claim 3, wherein said sealing means is also molded of a foamable urethane mixture.

References Cited in the file of this patent

UNITED STATES PATENTS

| | | |
|---|---|---|
| 2,190,476 | Haupt et al. | Feb. 13, 1940 |
| 2,276,635 | Weber | Mar. 17, 1942 |
| 2,307,508 | Jayne | Jan. 5, 1943 |
| 2,573,213 | Miller | Oct. 30, 1951 |
| 2,588,876 | Quist | Mar. 11, 1952 |
| 2,803,370 | Lennard | Aug. 20, 1957 |
| 2,804,228 | Hartley | Aug. 27, 1957 |
| 2,841,804 | Case | July 8, 1958 |
| 2,867,346 | Champagnat | Jan. 6, 1959 |

FOREIGN PATENTS

| | | |
|---|---|---|
| 291,618 | Great Britain | June 7, 1928 |